United States Patent
Donovan et al.

(10) Patent No.: US 12,006,262 B2
(45) Date of Patent: Jun. 11, 2024

(54) PLASTICIZER DEDUSTING AGENTS FOR JOINT COMPOUNDS

(71) Applicant: UNITED STATES GYPSUM COMPANY, Chicago, IL (US)

(72) Inventors: Alexander J. Donovan, Lake Forest, IL (US); Tyler Kincaid, Chicago, IL (US); David Pelot, Chicago, IL (US); Richard B. Stevens, Village of Lakewood, IL (US); Robert H. Negri, Lake Villa, IL (US); Naveen Punati, Lake Zurich, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 614 days.

(21) Appl. No.: 16/812,827

(22) Filed: Mar. 9, 2020

(65) Prior Publication Data
US 2021/0017082 A1    Jan. 21, 2021

Related U.S. Application Data

(60) Provisional application No. 62/876,302, filed on Jul. 19, 2019.

(51) Int. Cl.
*C04B 28/14*    (2006.01)
*C04B 24/04*    (2006.01)
(Continued)

(52) U.S. Cl.
CPC ............ *C04B 28/14* (2013.01); *C04B 24/045* (2013.01); *C04B 24/383* (2013.01);
(Continued)

(58) Field of Classification Search
CPC ..... C04B 28/14; C04B 24/045; C04B 24/383; C04B 2103/0075
See application file for complete search history.

(56) References Cited

U.S. PATENT DOCUMENTS

| | | | |
|---|---|---|---|
| 3,867,335 A | 2/1975 | Reed et al. | |
| 3,907,725 A | 9/1975 | Forte et al. | |
| (Continued) | | | |

FOREIGN PATENT DOCUMENTS

WO    WO-0034200 A1 *  6/2000    ............. C04B 26/02

OTHER PUBLICATIONS

International Search Report and Written Opinion mailed Oct. 2, 2020 for PCT/US2020/039087 to United States Gypsum Company filed Jun. 23, 2020.

*Primary Examiner* — John E Uselding
(74) *Attorney, Agent, or Firm* — Vorys, Sater, Seymour and Pease LLP; Pradip Sahu; Philip T. Petti

(57) ABSTRACT

A joint compound including calcium sulfate hemihydrate and/or at least one filler, wherein a total amount of the at least one filler and/or calcium sulfate hemihydrate is at least about 50 wt % of the joint compound on a dry (water-free) basis, preferably the filler comprises calcium carbonate, calcium sulfate dihydrate, or calcium sulfate anhydrite, or a mixture thereof; binder at up to about 15 wt % of the joint compound on a dry basis; polymer thickener at up to about 3 wt % of the joint compound on a dry basis; plasticizer dedusting agent at about 0.01 to about 3 wt % of the joint compound on a dry (water free) basis; and an additive up to about 10 wt % of the joint compound on a dry basis.

18 Claims, 1 Drawing Sheet

(51) Int. Cl.
*C04B 24/38* (2006.01)
*C04B 103/00* (2006.01)
*C04B 103/30* (2006.01)
*C04B 103/44* (2006.01)
*C04B 111/00* (2006.01)

(52) U.S. Cl.
CPC .. *C04B 2103/0075* (2013.01); *C04B 2103/30* (2013.01); *C04B 2103/44* (2013.01); *C04B 2111/00681* (2013.01)

(56) References Cited

U.S. PATENT DOCUMENTS

| | | |
|---|---|---|
| 4,525,388 A | 6/1985 | Rehder et al. |
| 5,494,947 A | 2/1996 | Kaplan |
| 5,746,822 A | 5/1998 | Espinoza et al. |
| 5,779,786 A | 7/1998 | Patel |
| 6,673,144 B2 | 1/2004 | Immordino, Jr. et al. |
| 6,676,746 B2 | 1/2004 | Langford |
| 6,805,741 B1 | 10/2004 | Liu et al. |
| 8,329,785 B2 | 12/2012 | Langford |
| 8,673,071 B2 | 3/2014 | Immordino, Jr. et al. |
| 9,643,887 B2 | 5/2017 | Ayambem et al. |
| 9,683,143 B2 | 6/2017 | Negri et al. |
| 10,329,203 B2 | 6/2019 | Ayambem et al. |
| 2003/0066456 A1 | 4/2003 | Langford |
| 2008/0141909 A1 | 6/2008 | Immordino et al. |
| 2010/0175590 A1 | 7/2010 | Stevens et al. |
| 2013/0274395 A1* | 10/2013 | Arendt ............ C08K 5/10 524/290 |
| 2014/0275369 A1 | 9/2014 | Stewart et al. |
| 2015/0158999 A1 | 6/2015 | Ayambem et al. |
| 2016/0376798 A1 | 12/2016 | Ayambem |
| 2017/0241881 A1 | 8/2017 | Pelot et al. |

* cited by examiner

PLASTICIZER DEDUSTING AGENTS FOR JOINT COMPOUNDS

FIELD OF THE INVENTION

This invention relates generally to joint compounds comprising plasticizer dedusting agents, such as glycol dibenzoates.

BACKGROUND OF THE INVENTION

In the construction of buildings, one of the most common building elements is gypsum wallboard, often known as drywall or gypsum paneling, used in the construction of walls and/or ceilings. The board may be composed of any of a variety of materials, including but not limited to, cementitious materials such as, for example, cement or gypsum. Walls made from gypsum wallboard are traditionally constructed by affixing the panels to wood studs or metal framing, and treating the joints between adjoining panels with a specially prepared adhesive called a joint compound. Gypsum panels easily accommodate walls that are unusual in size and can be shaped around structural elements such as beams or pipes. The side edges of the drywall panels are tapered, thus allowing the joint compound to be applied to the seam, between adjoining panels, in such a way that a monolithic surface is created when finished.

It is well known in the art that finishing a joint between boards involves at least three steps. First, a thin layer of joint compound is applied to the boards over the joint, and a liquid-permeable paper or fiberglass tape is embedded into it. Next, a second coat of joint compound is applied over the embedded joint tape. The second coat of joint compound typically extends approximately two inches beyond the edges of the joint tape. Finally, a third coat of joint compound is applied over the first two coats, where the third coat typically extends even further out from the edges of the joint tape. Both the second and third coat may be subsequently lightly sanded upon drying. Further coats may be necessary to achieve the desired level of finish in certain occupied spaces with critical lighting. Joint compounds are also used to make repairs of defects, such as uneven surfaces, holes, depressions, gaps, dents, and other imperfections including those around electrical boxes, piping and duct work, as well as corners created by the intersection of drywall boards.

There are several categories of joint compounds. Drying type compounds cure through the evaporation of water, whereas setting type joint compounds chemically react with water during the curing process. Setting type joint compounds typically use calcium sulfate hemihydrate, also known as stucco or Plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is an independence from having to wait for the joint compound to be completely dry prior to further finishing, as well as less shrinkage and cracking, and a higher overall strength of the finished joint. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound. The properties of a ready mixed setting type joint compound are taught in U.S. Pat. No. 5,746,822 to Espinoza, incorporated herein by reference. U.S. Pat. No. 5,746,822 to Espinoza et al discloses a cementitious composition of the setting type which can be caused to set and harden upon introduction of an accelerator. The cementitious base composition contains calcium sulfate hemihydrate as a principal filler material and certain non-calcium bearing phosphate additives which prevent setting in the presence of water. Or the ready-mixed cementitious composition can be used as a drying type joint compound without the accelerator. Additional ingredients which may be used in the joint compound include preservatives, wetting agents, defoamers and plasticizers.

U.S. Pat. No. 5,494,947 to Kaplan discloses a joint compound comprising an acrylate, a biocide, a reinforcing agent, a latex, a first surfactant, a plasticizer, a coalescent agent, a fungicide, a filler, and a second coalescent. The plasticizer may be a liquid benzoate ester. The plasticizers impart high strength to the flexible joint compound mixture. One such class of plasticizers providing optimal results are the liquid benzoate esters. One such ester, dipropylene glycol dibenzoate, sold as Benzoflex® 9-88 by Velsicol, located in Rosemont, Ill. The formula weight percents will range anywhere from 0 to 8 percent.

U.S. Pat. No. 5,779,786 to Patel discloses ready-mixed setting-type joint compound from a mixture that includes calcium sulfate hemihydrate, water, and a set-retarding agent. The joint compound preferably includes a plasticizer to provide better adhesion to the substrate in cold weather. Useful plasticizers include dibutyl phthalate, which is available from Kalama Chemicals of Seattle, Wash. One suitable plasticizer is sold under the trade name BENZOPLEX by Velsicol Chemical Corp. of Memphis, Tenn.

U.S. Pat. No. 6,805,741 to Liu et al discloses a ready-mixed composition, which sets when mixed with an activator for the reaction of calcined gypsum with water to form set gypsum. The composition comprises water and calcined gypsum, as well as a set preventer comprising a polyacrylic acid and/or a salt thereof. The composition may further comprise plasticizer, wherein the plasticizer is a polyether polycarboxylic compound, a salt of a polyether polycarboxylic compound, or combinations thereof.

U.S. Pat. No. 8,673,071 to Immordino Jr. et al which matured from US Patent Application Publication No. 20080141909 to Immordino Jr. et al discloses improving bonding between joint compounds and substrates by the addition of thickeners, plasticizers and/or polyvinyl alcohol powder.

U.S. Pat. No. 9,643,887 to Ayambem et al discloses a joint compound composition, comprising: a filler material selected from the group consisting of: calcium carbonate, calcium sulfate dihydrate, and calcium sulfate hemihydrate; a first binder comprising a first polymer, the first binder having a glass transition temperature that is equal to or greater than about $-10°$ C.; and a second binder comprising a second polymer, the second binder having a glass transition temperature in the range of about $-80°$ C. to about $10°$ C., wherein the glass transition temperature of the first binder is at least about $5°$ C. greater than the glass transition temperature of the second binder; and wherein the first and second polymers have the same chemistry. The second binder further comprises a plasticizer. The plasticizer is selected from the group consisting of: a diethylene dibenzoate ester and a dipropylene dibenzoate ester. The plasticizer depresses the glass transition temperature of the polymer.

U.S. Pat. No. 9,683,143 to Negri et al discloses an adhesive composition comprising a polymeric binder, filler, rheological modifier and associative thickener. The binder is a combination of Polyvinyl Acetate with Polyvinyl Alcohol in an amount from 10% to 40% by weight. The composition may further comprise a compound selected from the group consisting of a coloring agent, foaming agent, defoaming agent, buffering agent, anti-sedimentation agent, wetting agent, plasticizer, and any combination thereof.

US 2010/0175590 to Stevens et al discloses a setting-type, ready-mix joint compound and a set initiator. The setting-type joint compound includes a ready-mixed, setting-type joint compound base with a calcium-free phosphate set preventing agent that impedes chemical hydration of a gypsum component of the setting-type joint compound. The joint compound base is free of calcium carbonate. The joint compound optionally includes plasticizers.

Between coats of joint compound, and before the wall is decorated, it is necessary to sand the joint compound to even the surface. While doing so, the dust generated is generally very fine and tends to remain airborne, settling out only after long periods of time. This long residence time in the air allows it to travel long distances from the site of the wall. In a home repair, this fine dust is not confined to the area immediately adjacent to where the joint compound is being used, but is often found throughout the house, resulting in fine dust settling everywhere.

Liquid mineral oils and solid waxes (for example polyethylene glycol wax) are known to reduce dust in gypsum-based compositions and are often incorporated with the joint compounds as a dedusting agent. A dedusting agent is defined as a material with the ability to reduce the production of airborne dust generated upon sanding or other disturbance and/or with the ability to reduce the airborne residence time of the dust generated compared to a similar material without the dedusting additive. Airborne dust typically has a particle size of less than 10 microns. Examples of mineral oil and solid wax dedusting agents are described in U.S. Pat. No. 6,673,144 to Immordino, Jr. et al., U.S. Pat. No. 6,676,746 to Langford and U.S. Pat. No. 8,329,785 to Langford and US Patent Application Publication No. 2003/0066456 to Langford. In particular, U.S. Pat. No. 8,329,785 to Langford discloses joint compound ingredients such as preservatives, fungicides, anti-freeze, wetting agents, defoamers, flocculents, such as polyacrylamide resin, and plasticizers, such as dipropylene glycol dibenzoate. U.S. Pat. No. 8,329,785 to Langford also discloses, as dust reducing additives, oils, surfactants, solvents, waxes, and other petroleum derivatives. US2003/0066456 to Langford discloses, as dust reducing additives, oils, such as mineral oils, vegetable oils and animal oils, surfactants, oleoresinous mixtures, pitch, solvents, paraffins, waxes, including natural and synthetic wax, glycols, and other petroleum derivatives. Other materials which do not fit within the above categories, such as molasses, may also effectively reduce the quantity of dust generated by a wall repair compound according to Langford.

However, these dedusting agents have a myriad of limitations. For example, liquid mineral oils and waxes are substantially individually dispersed, free molecules in the joint composition. When drying, thermodynamics and their wetting physical properties cause these molecules to migrate toward the surface of the gypsum product, which results in an uneven distribution of dust reducing properties. Further, when at the surface, mineral oils and liquid waxes also cause the loss of adhesion to the substrate at higher concentrations. Additionally, when some water-soluble, synthetic waxes are added to the slurry water with other solid components, the solid synthetic waxes tend to float on the surface for a long time, dissolving slowly after prolonged mixing.

Alternative dedusting agents that include wax emulsions and polymer coated wax core particulates have been developed, for example, as described in U.S. Pat. No. 10,329,203 to Ayambem et al. and U.S. Patent Application Publication Nos. 2015/0158999 and 2016/0376798 of Ayambem.

US 2014/0275369 to Stewart et al discloses ready to use (wet) and setting (dry) repair products with antistatic additives having reduced persistent airborne dust particulates upon sanding thereof. The repair products can also include one or more rheology modifiers which can include surfactants, thickeners, dispersing aids, and/or plasticizers.

SUMMARY OF THE INVENTION

This invention relates generally to joint compounds comprising novel plasticizer dedusting agents.

The joint compound comprising:
calcium sulfate hemihydrate and/or at least one filler, wherein a total amount of the at least one filler and/or calcium sulfate hemihydrate is at least about 50 weight percent (wt %), preferably at least 75 wt %, of the joint compound on a dry (water-free) basis, preferably the filler comprises calcium carbonate, calcium sulfate dihydrate, or calcium sulfate anhydrite, or a mixture thereof;
a binder at up to about 15 wt % of the joint compound on a dry basis; a polymer thickener at up to about 3 wt % of the joint compound on a dry basis;
a plasticizer dedusting agent at about 0.01 to about 3 wt %, or typically about 0.05 to about 2 wt %, or typically about 0.1 to about 1 wt %, or more typically about 0.1 to about 0.5 wt %, of the joint compound on a dry (water free) basis; and
an additive up to about 10 wt % of the drying-type joint compound on a dry basis.

The joint compound may be a drying-type ("DT") joint compound comprising joint compound components and water,
wherein the joint compound components comprise the filler, the binder, the polymer thickener, the plasticizer dedusting agent, and the additive, wherein:
the filler comprises a primary filler at about 50 to about 98 wt % of the drying-type joint compound on a dry basis, wherein the primary filler comprises one selected from the group consisting of calcium carbonate, calcium sulfate dihydrate, and calcium sulfate anhydrite, and a mixture thereof;
the filler comprises a secondary filler at up to about 25 wt % of the drying-type joint compound on a dry basis;
wherein the primary filler and the secondary filler total at least about 75 wt % on a dry basis;
the binder is about 1 to about 15 wt % of the drying-type joint compound on a dry basis;
the polymer thickener is about 0.05 to about 3 wt % of the drying-type joint compound on a dry basis;
the plasticizer dedusting agent is about 0.01 to about 3 wt %, typically about 0.05 to about 2 wt %, or typically about 0.1 to about 1 wt %, or typically about 0.1 to about 0.5 wt %, or typically about 0.3 to about 3 wt %, or preferably about 0.5 to about 3 wt %, more preferably about 0.5 to about 2 wt %, or furthermore preferably about 0.7 to about 2 wt %, or most preferably about 0.7 to about 1.5 wt %, of the joint compound on a dry basis; and the additive is up to about 10 wt % of the drying-type joint compound on a dry basis; and wherein the water is at a weight ratio of water to joint compound components of about 1:3 to about 3:1.

The joint compound may be a setting-type ("ST") joint compound, wherein:

the calcium sulfate hemihydrate is about 20 to about 99 wt % of the setting-type joint compound on a dry basis;

the filler is from about 0.44 wt % to about 43 wt % of the setting-type joint compound on a dry basis;

the total calcium sulfate hemihydrate and the filler is about 63 wt % to about 99.44 wt % of the setting-type joint compound on a dry basis;

the binder is about 0.5 to about 8 wt % of the setting-type joint compound on a dry basis;

the polymer thickener is about 0.05 to about 2 wt % of the setting-type joint compound on a dry basis;

the plasticizer dedusting agent is at about 0.01 to about 3 wt %, preferably about 0.05 to about 2 wt %, more preferably about 0.1 to about 1 wt %, most preferably about 0.1 to about 0.5 wt %, of the joint compound on a dry (water free) basis; and the additive is up to about 10 wt % of the setting-type joint compound on a dry basis.

The joint compound may be a ready-mixed, setting-type joint compound comprising joint compound components and water, wherein the joint compound components comprise the calcium sulfate hemihydrate, the binder, the polymer thickener, the plasticizer dedusting agent, the additive, a set retarder and, if present, the filler, wherein:

the calcium sulfate hemihydrate is about 20 weight percent (wt %) to about 99 wt % of the ready-mixed, setting-type joint compound on a dry basis;

the filler is about 0.989 wt % to about 55 wt % of the ready-mixed, setting-type joint compound on a dry basis;

the total calcium sulfate hemihydrate and the filler are about 75 wt % to about 99.989 wt % of the ready-mixed, setting joint compound on a dry basis;

the set retarder is about 0.001 to about 2 wt % of the ready-mixed, setting-type joint compound on a dry basis;

the binder is up to about 8 wt % of the ready-mixed, setting-type joint compound on a dry basis;

the polymer thickener is up to about 2 wt % of the ready-mixed, setting-type joint compound on a dry basis;

the plasticizer dedusting agent is about 0.01 to about 3 wt %, preferably about 0.05 to about 2 wt %, more preferably about 0.1 to about 1 wt %, most preferably about 0.1 to about 0.5 wt %, of the joint compound on a dry (water free) basis; and the additive is up to about 10 wt % of the ready-mixed, setting-type joint compound on a dry basis; and the water is at a ratio of water to joint compound components of about 1:3 to about 3:1.

Other advantages, benefits and aspects of the invention are discussed below, are illustrated in the accompanying figures, and will be understood by those of skill in the art from the more detailed disclosure below. All percentages, ratios and proportions herein are by weight, unless otherwise specified.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques.

DETAILED DESCRIPTION OF THE INVENTION

Figure 1:
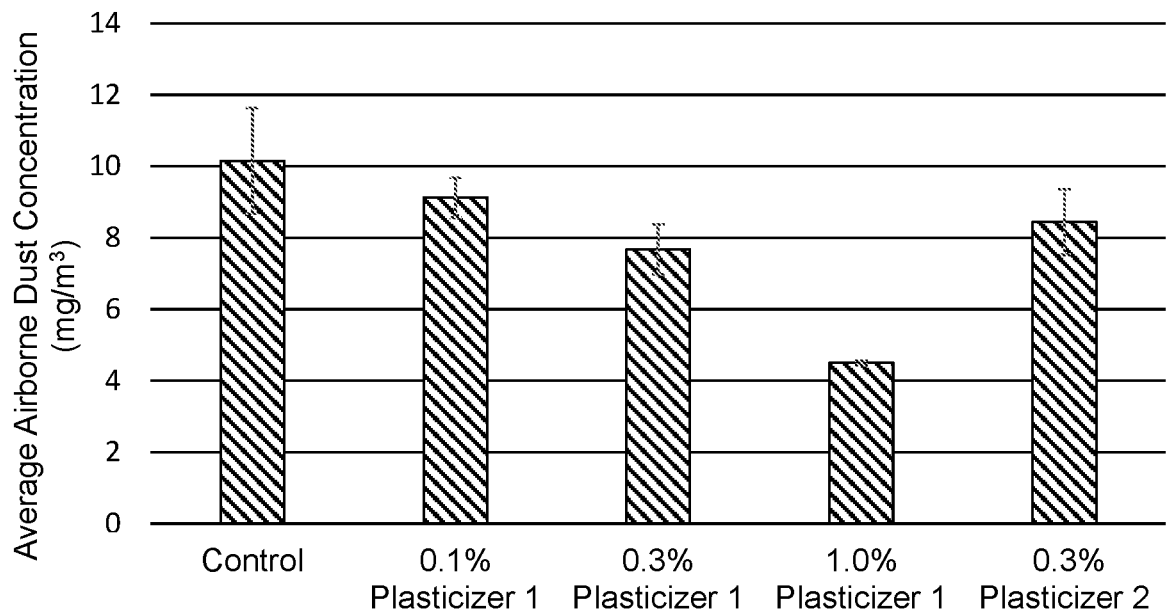
FIG. 1 is a plot of the average airborne dust concentration ($mg/m^3$) produced from each Example sample.

All percentages and ratios used herein, unless otherwise specified, are by weight (i.e., wt %) unless otherwise indicated.

The present invention provides joint compounds comprising plasticizer dedusting agent, such as glycol dibenzoates.

Regarding known wax emulsions and polymer coated wax core particulates, these plasticizer dedusting agents are hydrophobic particulates with a coating (polymer or emulsifier) that allows for better dispersion in water. Unlike some dedusting additives, such as polyethylene glycol, plasticizers minimally affect performance. Typically there is an absence of dedusting agents other than plasticizer. Thus, typically there is an absence of one or more of liquid mineral oils and solid waxes (for example polyethylene glycol wax), wax emulsions and polymer coated wax core particulates.

Joint Compounds

The present invention is directed, at least in part, to joint compounds with less dusting properties. More specifically, the joint compounds comprise a plasticizer dedusting agent.

The joint compound of the invention comprises:

calcium sulfate hemihydrate and/or at least one filler, wherein a total amount of the at least one filler and/or calcium sulfate hemihydrate is at least about 50 weight percent (wt %) of the joint compound on a dry (water-free) basis, wherein the filler comprises calcium carbonate, calcium sulfate dihydrate, or calcium sulfate anhydrite, or a mixture thereof;

a binder at up to about 15 wt % of the joint compound on a dry basis;

a polymer thickener at up to about 3 wt % of the joint compound on a dry basis;

a plasticizer dedusting agent at about 0.01 wt % to about 3 wt % of the joint compound on a dry (water free) basis; and an additive up to about 10 wt % of the drying-type joint compound on a dry basis.

A variety of joint compounds have been sold commercially, as well as described in printed publications and patents. Generally, such compound compositions are referred to as "drying-type" joint compounds, or "setting-type" joint compounds, or "ready-mixed, setting-type" joint compounds. They are made up of calciumسulfate dihydrate and/or at least one filler (e.g., calcium carbonate, calcium sulfate hemihydrate, or calcium sulfate anhydrite), a binder, polymer thickener, plasticizer, and various other additives such as a preservative. The plasticizer dedusting agent of the present invention is suitable for "drying-type" joint compounds, or "setting-type" joint compounds, or "ready-mixed, setting-type" joint compounds. The terms drying-type" joint compounds, "setting-type" joint compounds, an "ready-mixed, setting-type" joint compounds are terms of art.

Ready-mixed, drying-type joint compositions are premixed with water during manufacturing and require little or no addition of water at the job site. Drying-type joint compositions can also be dry powders that are mixed with water at the job site. Drying-type joint compounds harden when the water evaporates and the compound dries. Drying-type joint compounds substantially contain a filler component. Drying-type joint compounds contain inert filler component and have an absence of solid materials, such as calcium sulfate hemihydrate, that set when mixed with water. Prior to use (generally during manufacturing), the filler, a binder, a thickener, a dedusting agent, and optionally several other ingredients are mixed for a specific time with water to produce the drying-type joint compound. Such a composition has a basic pH. Once the drying-type joint compound is applied to the wallboard panels, the composition dries (i.e., water evaporates) and a dry, relatively hard cementitious material remains.

The joint compound may be a drying-type joint compound comprising joint compound components and water,
wherein the joint compound components comprise the filler, the binder, the polymer thickener, the plasticizer dedusting agent, and the additive, wherein:
the filler comprises a primary filler at about 50 to about 98 wt % of the drying-type joint compound on a dry basis, wherein the primary filler comprises one selected from the group consisting of calcium carbonate, calcium sulfate dihydrate, and calcium sulfate anhydrite, and a mixture thereof;
the filler comprises a secondary filler at up to about 25 wt % of the drying-type joint compound on a dry basis;
wherein the primary filler and the secondary filler total at least about 75 wt % on a dry basis;
the binder is about 1 to about 15 wt % of the drying-type joint compound on a dry basis;
the polymer thickener is about 0.05 to about 3 wt % of the drying-type joint compound on a dry basis;
the plasticizer dedusting agent is about 0.01 to about 3 wt %, typically about 0.05 to about 2 wt %, or typically about 0.1 to about 1 wt %, or typically about 0.1 to about 0.5 wt %, or typically about 0.3 to about 3 wt %, or preferably about 0.5 to about 3 wt %, more preferably about 0.5 to about 2 wt %, or furthermore preferably about 0.7 to about 2 wt %, or most preferably about 0.7 to about 1.5 wt %, of the joint compound on a dry basis; and
the additive is up to about 10 wt % of the drying-type joint compound on a dry basis; and
wherein the water is at a weight ratio of water to joint compound components of about 1:3 to about 3:1.

Table 1 provides examples of drying-type joint compound formulations of the present invention where the water is present in the mixture for a ready mixed, drying-type joint or the water is later mixed with the other components in the prescribed amounts. Typically values in a single column of the table are used together. However, values from a column can be substituted into another column where mathematically permitted.

TABLE 1

Drying-type (DT) joint compound formulations

| Component | Useable range | Preferred range | Most Preferred Range | Specific example |
|---|---|---|---|---|
| Primary Filler (wt % on a dry basis) | 50 to 98 | 50 to 93 | 65 to 93* or 50 to 93** | 65 to 93* or 55 to 75** |
| Secondary Filler*** (wt % on a dry basis) | up to 25 | up to 25 | 3 to 25 | 4 to 25 |
| Total of Primary Filler and Secondary Filler (wt % on dry basis) | at least 75 | at least 75 | at least 75 | at least 80 |
| Binder (wt % on a dry basis) | 1 to 15 | 1 to 10 | 1 to 10 | 1 to 8 |
| Polymer Thickener (wt % on a dry basis) | 0.05 to 3 | 0.1 to 3 | 0.1 to 2 | 0.5 to 2 |
| Plasticizer dedusting agent (wt % on a dry basis) | 0.01 to 3 | 0.3 to 3 or 0.5 to 3 | 0.5 to 2.0 or 0.7 to 2.0 or 0.7 to 1.5 | 0.7 to 2.0 |
| Other Additives (wt % on a dry basis) | up to 10 | up to 10 | 0.01 to 10 | 0.1 to 10 |
| Water (weight ratio of water to joint compound components) | 1:3 to 3:1 | 1:3 to 2:1 | 1:3 to 1:1 | 1:2 |

*if primary filler is mainly (more than half on a dry wt. % basis) calcium carbonate
**if primary filler is mainly (more than half on a dry wt. % basis) calcium sulfate dihydrate and/or calcium sulfate anhydrite A setting-type joint compound generally includes calcium sulfate hemihydrate ($CaSO_4 \cdot \frac{1}{2}H_2O$; also referred to as calcined gypsum). A setting type joint compound is a joint compound that sets rather than merely dries. Upon being mixed with water, the calcium sulfate hemihydrate is hydrated, which causes dihydrate crystals to form and interlock. Once completed, a dry, relatively hard cementitious material remains. The rehydration of calcium sulfate hemihydrate normally takes place over a fairly short period of time. Therefore, setting-type compound compositions are typically supplied to the job site in the form of a dry powder to which the user then adds a sufficient amount of water to give the compound a suitable consistency to be applied to the wall.

The joint compound may be a setting-type joint compound, wherein:
the calcium sulfate hemihydrate is about 20 to about 99 wt % of the setting-type joint compound on a dry basis;
the filler is about 0.44 wt % to about 43 wt % of the setting-type joint compound on a dry basis;
the total calcium sulfate hemihydrate and filler is about 63 wt % to about 99.44 wt % of the setting-type joint compound on a dry basis;
the binder is about 0.5 to about 8 wt % of the setting-type joint compound on a dry basis;
the polymer thickener is about 0.05 to about 2 wt % of the setting-type joint compound on a dry basis;
the plasticizer dedusting agent is at about 0.01 to about 3 wt %, preferably about 0.05 to about 2 wt %, more preferably about 0.1 to about 1 wt %, most preferably about 0.1 to about 0.5 wt %, of the joint compound on a dry (water free) basis; and
the additive is up to about 10 wt % of the setting-type joint compound on a dry basis.

Table 2 provides examples of the dry powder of setting-type joint compound formulations of the present invention. Water can be added to the dry powder before use at a weight ratio of water to joint compound components of about 1:3 to about 3:1, preferably about 1:2. Typically values in a single column of the table are used together. However, values from a column can be substituted into another column where mathematically permitted.

TABLE 2

Setting-type (ST) joint compound formulations

| Component | Useable range | Preferred range | Most Preferred range | Specific example |
|---|---|---|---|---|
| Calcium Sulfate Hemihydrate (wt % on a dry basis) | 20 to 99 | 50 to 98 | 60 to 85 | 65 to 85 |
| Filler (wt % on a dry basis) | 0.44 to 43 | 0.84 to 33 | 13.5 to 29 | 4.5 to 25 |
| Total calcium sulfate hemihydrate and filler (wt. % on a dry basis) | 63 to 99.44 | 83 to 98.84 | 89 to 98.7 | 89.5 to 98.7 |
| Binder (wt % on a dry basis) | 0.5 to 8 | 1 to 8 | 1 to 4 | 1 to 4 |
| Polymer Thickener (wt % on a dry basis) | 0.05 to 2 | 0.1 to 2 | 0.1 to 1 | 0.1 to 1 |
| Plasticizer dedusting agent (wt % on a dry basis) | 0.01 to 3 | 0.05 to 2 | 0.1 to 1 (or 0.3 to 1 if total calcium sulfate hemihydrate and filler is 89 to 98.5) | 0.1 to 0.5 |
| Other Additives (wt % on a dry basis) | up to 10 | up to 5 | 0.1 to 5 | 0.1 to 5 |

A ready-mixed, setting-type joint compound is an aqueous slurry setting-type joint compound that contains a sufficient concentration of set retarder to prevent setting before use. When ready to use, an accelerator is added in an amount to achieve a desired set time.

The joint compound may be a ready-mixed, setting-type joint compound comprising joint compound components and water,
wherein the joint compound components comprise the calcium sulfate hemihydrate, the binder, the polymer thickener, the plasticizer dedusting agent, the additive, a set retarder and, if present, the filler,
wherein:
the calcium sulfate hemihydrate is about 20 weight percent (wt %) to about 99 wt % of the ready-mixed, setting-type joint compound on a dry basis;
the filler is about 0.989 wt % to about 55 wt % of the ready-mixed, setting-type joint compound on a dry basis;
the total calcium sulfate hemihydrate and the filler are about 75 wt % to about 99.989 wt % of the ready-mixed, setting joint compound on a dry basis;
the set retarder is about 0.001 to about 2 wt % of the ready-mixed, setting-type joint compound on a dry basis,
the binder is up to about 8 wt % of the ready-mixed, setting-type joint compound on a dry basis;
the polymer thickener is up to about 2 wt % of the ready-mixed, setting-type joint compound on a dry basis;
the plasticizer dedusting agent about 0.01 to about 3 wt %, preferably about 0.05 to about 2 wt %, more preferably about 0.1 to about 1 wt, most preferably about 0.1 to about 0.5 wt %, of the joint compound on a dry (water free) basis and
the additive is up to about 10 wt % of the ready-mixed, setting-type joint compound on a dry basis; and
the water is at a ratio of water to joint compound components of about 1:3 to about 3:1.

Table 3 provides examples of the ready-mixed, setting-type joint compound formulations of the present invention. Typically values in a single column of the table are used together. However, values from a column can be substituted into another column where mathematically permitted.

TABLE 3

Ready-mixed, setting-type joint compound formulations

| Component | Useable range | Preferred range | Most Preferred Range | Specific example |
|---|---|---|---|---|
| Calcium Sulfate Hemihydrate (wt % on a dry basis) | 20 to 99 | 50 to 98 | 60 to 85 | 65 to 85 |
| Filler (wt % on a dry basis) | 0.989 to 55 | 1.93 to 33 | 14.6 to 28 | 13.45 to 23.75 |
| Total calcium sulfate hemihydrate and filler (wt. % on a dry basis) | 75 to 99.898 | 83 to 99.93 | 88 to 99.6 | 88.75 to 98.45 |
| Set Retarder (wt % on a dry basis) | 0.001 to 2 | 0.01 to 2 | 0.1 to 1 | 0.25 to 0.75 |
| Binder (wt % on a dry basis) | up to 8 | up to 6 | up to 4 | 1 to 4 |
| Polymer Thickener (wt % on a dry basis) | up to 2 | up to 2 | 0.1 to 1 | 0.1 to 1 |
| Plasticizer dedusting agent (wt % on a dry basis) | 0.01 to 3 | 0.05 to 2 | 0.1 to 1 (or 0.3 to 1 if total calcium sulfate hemihydrate is 88 to 99.4) | 0.1 to 0.5 |
| Other Additives (wt % on a dry basis) | up to 10 | 0.01 to 5 | 0.1 to 5 | 0.1 to 5 |
| Water (weight ratio of water to joint compound components) | 1:3 to 3:1 | 1:3 to 2:1 | 1:3 to 1:1 | 1:2 |

Plasticizer Dedusting Agent

The plasticizer dedusting agents used in the present invention comprises one or more of any suitable plasticizer.

The plasticizer dedusting agent may comprise one or more dibenzoates, e.g., glycol dibenzoates. Typical dibenzoate plasticizer is one or more of glycol dibenzoates, such as diethylene glycol dibenzoate, dipropylene glycol dibenzoate and propylene glycol dibenzoate. Thus, for example, the plasticizer dedusting agents may include, without limitation, dipropylene glycol dibenzoate; a mixture of diethylene glycol dibenzoate and dipropylene glycol dibenzoate; or a mixture of diethylene glycol dibenzoate, dipropylene glycol dibenzoate and propylene glycol dibenzoate.

The plasticizer may be one or more of hydroxypropyl cellulose (HPC), sorbitol, and related sugar alcohols, polyvinylpyrolidone, and polymer plasticizers. However, any one or more of these may be absent.

The plasticizer dedusting agent may comprise one or more ester plasticizers such as one or more of sebacates, adipates, maleates, such as bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), gluterates, and azelates; trimellitates, such as trimethyl trimellitate (TMTM), tri-(2-ethylhexyl) trimellitate (TEHTM)(TOTM), tri-(n-octyl,n-decyl) trimellitate (ATM), tri-(heptyl,nonyl) trimellitate (LTM), and n-octyl trimellitate (OTM), azelates, and benzoates, 1,2-cyclohexane dicarboxylic acid diisononyl ester, alkyl sulphonic acid phenyl ester (ASE), glycols and polyethers, such as triethylene glycol dihexanoate (3G6, 3GH), tetraethylene glycol diheptanoate (4G7), polymeric plasticizers and polybutene. However, any one or more of these may be absent.

Typically there is an absence of phthalate plasticizers.

Typically there is an absence of organophosphate plasticizers.

There is an absence of chlorinated paraffins.

There may be an absence of trimellitates.

Preferably, the plasticizer dedusting agents are not used with other plasticizers not functioning as dedusting agents.

More typically, the plasticizer dedusting agent is solely one or more glycol dibenzoates.

Plasticizer dedusting agents may be used in liquid form, dry form, encapsulated liquid form, suspensions and solutions.

The plasticizer can be mixed either with the joint compound components of the joint compound formulation or a joint compound slurry. Alternatively, the plasticizer dedusting agent dispersed in an aqueous solvent can be added to the joint compound slurry.

One benefit to this invention is that a reduction in sand paper blocking is seen with this low level of plasticizer dedusting agent and good dedusting is still achieved. Another benefit is that this low level of plasticizer dedusting agent also reduces the "stick and grab" issue with sand paper. Preferably, when preparing a joint compound, the plasticizer dedusting agent is dispersed as an aqueous suspension, about 0.01 to about 3 wt %, preferably about 0.05 to about 2 wt %, more preferably about 0.1 to about 1 wt %, most preferably about 0.1 to about 0.5 wt %, of the joint compound on a dry (water free) basis. The plasticizer dedusting agent may be no less than about 0.01 wt %, preferably no less than about 0.05 wt %, more preferably no less than about 0.1 wt % or no less than about 0.3 wt % (all on a dry basis). In the case of a drying-type joint compound the plasticizer dedusting agent is furthermore preferably no less than about 0.5 wt % or most preferably no less than 0.7 wt % (all on a dry basis). The plasticizer dedusting agent may be no more than about 3 wt %, preferably no more than about 2 wt %, typically no more than about 1 wt %, and typically no more than about 0.5 wt %.

Calcium Sulfate Hemihydrate

Setting-type joint compounds and ready-mixed, setting-type joint compounds include calcium sulfate hemihydrate. There are two principal forms used, the alpha and beta crystalline forms. In general, the alpha form is the more expensive of the two and produces a stronger product. The beta form is adequate for many uses and, being less expensive, is more commonly used. For joint compounds of the invention, either type of the hemihydrate may be used including mixtures, but the alpha form is preferred.

For setting-type joint compounds and ready-mixed, setting-type joint compounds, the calcium sulfate hemihydrate can be included at about 20 wt % to about 99 wt % on a dry basis of the joint compound, preferably about 50 wt % to about 98 wt % on a dry basis, more preferably about 50 wt % to about 80 wt % on a dry basis and most preferably about 65 wt % to about 75 wt % on a dry basis.

Fillers

Typically joint compound of the present invention includes calcium sulfate hemihydrate and/or at least one filler, wherein a total amount of the at least one filler and/or calcium sulfate hemihydrate is at least about 50 weight percent (wt %), preferably at least 75 wt %, of the joint compound on a dry (water-free) basis, preferably the filler comprises calcium carbonate, calcium sulfate dihydrate, or calcium sulfate anhydrite, or a mixture thereof.

In drying type joint compounds the fillers typically include a primary filler and optionally a secondary filler. Examples of primary fillers include: calcium carbonate (or limestone), calcium sulfate dihydrate, calcium sulfate anhydrite, and mixtures thereof. Another source of calcium carbonate is dolomite. Dolomite is an anhydrous carbonate mineral composed of calcium magnesium carbonate, e.g., $CaMg(CO_3)_2$. Thus, for example, in the invention calcium carbonate in an amount of about 50 wt % to about 98 wt % on a dry basis of the joint compound includes, one or more of calcium carbonate, limestone, and dolomite in an amount of about 50 wt % to about 98 wt % on a dry basis of the joint compound.

The primary filler can be included at about 50 wt % to about 98 wt % on a dry basis of the drying type joint compound, and preferably about 50 wt % to about 93 wt % on a dry basis. For example, calcium carbonate as the primary filler can preferably be included in a drying-type joint compound at about 65 wt % to about 93 wt % on a dry basis. In another example, calcium sulfate dihydrate as the primary filler can preferably be included in a drying-type joint compound at about 50 wt % to about 93 wt % on a dry basis, and more preferably at about 55 wt % to about 75 wt % on a dry basis.

Examples of secondary fillers include, but are not limited to, talc, glass micro bubbles, mica, perlite, pyrophyllite, silica, calcium sulfate anhydrite, diatomaceous earth, clay (e.g., attapulgite, sepiolite and kaolin), resin microspheres, and mixtures thereof. The perlite can be uncoated perlite. The perlite can be coated perlite which is perlite coated with a hydrophobic coating, for example, a coating containing siloxane or silane. The perlite can be a mixture of coated perlite and uncoated perlite. Secondary fillers may be useful as fillers and also used to impart specific properties to the joint compounds. For example, mica aids in reduced cracking of the joint compound as it dries, and is preferred in amounts of up to 25 wt % on a dry basis. It is also preferred to add clay in amounts of up to about 10 wt % on a dry basis to improve the body and workability of the joint compound, and as a rheology modifier.

The secondary filler can be included at up to about 25 wt % on a dry basis of the drying type joint compound, preferably about 3 wt % to about 25 wt % on a dry basis, and more preferably about 4 wt % to about 25 wt % on a dry basis.

In addition to functioning as filler, secondary fillers may impart specific properties to the joint compounds. For example, clay in amounts of up to about 10 wt % on a dry basis can be used to improve the body and workability of the joint compound, and as a rheology modifier.

Typically, the primary filler and the secondary fillers are at least about 75 wt % on a dry basis of the drying type joint compound. Typically, fillers have less than 15 wt % acrylates on a dry basis. The fillers may exclude acrylates.

Typically, the fillers for joint compounds of the present invention do not include >15 wt % acrylates. Typically, the fillers do not include acrylates.

In setting-type joint compounds and ready mix setting-type joint compounds the filler may be any of the above-mentioned primary fillers and/or any of the above-mentioned secondary fillers. Thus, the filler may be selected from only primary filler, only secondary filler, or a mixture of primary filler and secondary filer.

Typical examples of fillers include, but are not limited to, calcium carbonate, calcium sulfate dihydrate, calcium sulfate anhydrite, talc, glass micro bubbles, mica, perlite, pyrophyllite, silica, calcium sulfate anhydrite, diatomaceous earth, clay (e.g., attapulgite, sepiolite and kaolin), resin microspheres, and mixtures thereof.

For setting-type joint compounds the filler is typically from about 0.44 wt % to about 43 wt % of the setting-type joint compound on a dry basis.

For ready-mixed, setting-type joint compounds the filler is typically about 0.989 wt % to about 55 wt % of the ready-mixed, setting-type joint compound on a dry basis.

Perlite or expanded perlite is a lightweight filler that may be used where the joint compound (or drying-type, setting-type, ready-mixed, and/or setting-type) is preferably lightweight. Use of expanded perlite in a lightweight joint compound is taught in U.S. Pat. No. 4,454,267, which is herein incorporated by reference. Expanded perlite is a very lightweight material that contains many cracks and fissures. The perlite may be treated with a hydrophobic coating, for example a hydrophobic coating of silane or siloxane. For example, the perlite can be treated according to the teachings of U.S. Pat. No. 4,525,388 to Rehder et al, which is hereby incorporated by reference, so that the material does not increase in weight due to water absorbed by capillary action. The treated, expanded perlite, when used, is preferably present in concentrations of at least 5 wt % on a dry basis of the joint compound. The expanded perlite may be treated with a hydrophobic coating, such as polydimethyl siloxane or other organo-functional silanes having the general formula R—SiC$_3$, wherein R is selected from the group consisting of alkoxy and acetoxy such as acrylate, methacrylate, glycidoxy, epoxy propoxy, epoxy cyclohexyl and vinyl and X is selected from the group consisting of halogen, alkoxy and acetoxy. These silicones are hydrophobic film forming compounds which are available in aqueous or organic solvent solution, emulsion or dispersion forms.

Any joint compound of the present invention optionally includes resin microspheres as a filler to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacrylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

Binders

Any binder that is suitable for use in a joint compound is appropriate for use in the present invention. The binder can enhance the adhesion of the joint compound to its substrate, typically drywall. Preferred binders are soft and pliable rather than being extremely hard. Hard binders are likely to create more fine dust particles compared to pliable polymers.

Examples of binders include, but are not limited to, polyvinyl acetate, polyvinyl alcohol, ethylene vinyl acetate co-polymer, vinyl chlorides, vinyl acrylic co-polymer, styrene acrylics, styrene butadiene, polyacrylamide, polyvinylacrylic, latex emulsions, natural and synthetic starch, casein, and mixtures thereof. There may also be an absence of vinyl acetate.

For drying-type joint compounds, binders can be included at about 1 wt % to about 15 wt % on a dry basis of the joint compound, preferably about 1 wt % to about 10 wt % on a dry basis, and most preferably about 1 wt % to about 8 wt % on a dry basis.

For setting-type joint compounds, binders can be included at about 0.5 wt % to about 8 wt % on a dry basis of the joint compound, preferably about 1 wt % to about 8 wt % on a dry basis, and most preferably about 1 wt % to about 4 wt % on a dry basis.

For ready-mixed, setting-type joint compounds, binders, when included, can be at about 0.1 wt % to about 8 wt % on a dry basis of the joint compound, preferably 0.5 wt % to about 6 wt % on a dry basis, and most preferably about 1 wt % to about 4 wt % on a dry basis.

For example, latex emulsion binders are often used in joint compounds (drying-type and/or setting-type) and may be included in joint compounds of the invention. Examples include polyvinyl acetate, ethylene vinyl acetate and vinyl acrylic emulsions. The amount used may range from about 1.5 wt % to about 7 wt % on a dry basis of the joint compound, preferably about 2 wt % to about 5.5 wt % on a dry basis.

The weight ratio of total fillers to total binders is preferably in the range of from about 15:1 to about 5:1.

The present invention may employ one or more latexes, for example one latex as the sole latex with an absence of additional latex, or a combination of latexes wherein their respective glass transition temperatures may be the same or different. Each of the one or more latexes typically has a glass transition temperature in the range of less than 40° C., or less than 30° C., or less than 20° C., or less than 15° C., or less than 10° C., or less than 0° C., or less than −15° C. Each of the one or more latexes typically has a glass transition temperature of greater than about −100° C., greater than about −80° C., greater than about −40° C., or greater than 10° C., for example about 15° C. to less than 40° C. Compositions of the present invention may include mixtures comprising a first binder and a second. For example, the first binder may comprise a first polymer having a glass transition temperature that is equal to or greater than about −10° C. The second binder may comprise a second polymer having a glass transition temperature in the range of about −80° C. to about 10° C. In the case of these two binders the glass transition temperature of the first binder is at least about 5° C. greater than the glass transition temperature of the second binder, and the first and second polymers have the same chemistry. However, the present invention preferably does not use combinations of both first and second binders of compositions of U.S. Pat. No. 9,643,887 to Ayambem et al.

Polymer Thickeners

Polymer thickeners are added to the joint compound of the present invention. After water is added to the composition, the thickener becomes hydrated and swells, thereby thickening the joint compound. Thickeners are useful, for example, in helping to create the body and flow properties commonly associated with joint compounds. Preferably, the thickener is selected so that it substantially hydrates during the mixing process after water is added to the composition, with little or no hydration of the thickener occurring after mixing is completed, to prevent formation of lumps in the joint compound.

Examples of polymer thickeners include, but are not limited to, ethylhydroxy ethylcellulose, hydroxypropyl methylcellulose, methylhydroxypropyl cellulose, hydroxyethyl cellulose, cellulose-based gums (e.g., xanthan gum, gum Arabic, alginate, pectin, and guar gums), and mixtures thereof.

For drying-type joint compounds, polymer thickeners can be included at about 0.05 wt % to about 3 wt % on a dry basis of the joint compound, preferably about 0.1 wt % to about 3 wt % on a dry basis, more preferably about 0.1 wt % to about 2 wt % on a dry basis, and most preferably about 0.5 wt % to about 2 wt % on a dry basis.

For setting-type joint compounds, polymer thickeners can be included at about 0.05 wt % to about 2 wt % on a dry basis of the joint compound, preferably about 0.1 wt % to about 2 wt % on a dry basis, and most preferably about 0.1 wt % to about 1 wt % on a dry basis.

For ready-mixed, setting-type joint compounds, polymer thickeners, when included, can be at 0.01 wt % to about 2 wt % on a dry basis of the joint compound, preferably about 0.1 wt % to about 2 wt % on a dry basis, and most preferably about 0.1 wt % to about 1 wt % on a dry basis.

Set Retarders

Set retarders are included in ready-mixed, setting-type joint compounds. Set retarders are optionally included in drying-type joint compounds and setting-type joint compounds and are considered one of the other additives in Tables 1 and 2.

Set retarders (or set inhibitors or set preventer) slow the chemical setting of the joint compounds to provide ample time to properly apply the joint compound before hardening.

Examples of set retarders include, but are not limited to, polymer compositions including acrylic acid and acrylamide monomer units (e.g., a copolymer (or a mixture of copolymers) of acrylic acid and acrylamide or a blend of a homopolymer of acrylic acid and a homopolymer of acrylamide), as described in U.S. Pat. No. 5,779,786, incorporated herein by reference.

Additional examples of non-calcium bearing phosphate set retarders include, but are not limited to, zinc hexametaphosphate, potassium tripolyphosphate, tetra sodium pyrophosphate, sodium tripolyphosphate, monoammonium phosphate, and monobasic potassium phosphate, as described in U.S. Pat. No. 5,746,822, incorporated herein by reference.

Examples of set retarders include, but are not limited to, polymer compositions including polyacrylic acid and/or a salt of polyacrylic acid, as described in U.S. Pat. No. 6,805,741, incorporated herein by reference.

For ready-mixed, setting-type joint compounds, set retarders can be included at about 0.001 wt % to about 2 wt % on a dry basis of the joint compound, preferably about 0.01 wt % to about 2 wt % on a dry basis, more preferably about 0.1 wt % to about 1 wt % on a dry basis, and most preferably about 0.25 wt % to about 0.75 wt % on a dry basis.

For drying-type joint compounds and setting-type joint compounds, set retarders, when included, can be at about 0.001 wt % to about 2 wt % on a dry basis of the joint compound, preferably about 0.01 wt % to about 2 wt % on a dry basis, more preferably about 0.1 wt % to about 1 wt % on a dry basis, and most preferably about 0.25 wt % to about 0.75 wt % on a dry basis.

Set Accelerators

Set accelerators added to ready-mixed, setting-type joint compounds at the time of use. Set accelerators are optionally included in drying-type joint compounds and setting-type joint compounds and are considered one of the other additives in Tables 1 and 2.

Set accelerators (or set initiators or activators) accelerate and/or initiate setting and/or drying of the joint compounds.

Examples of set initiators include, but are not limited to, metallic salts that provide acidic cations, such as aluminum sulfate, potassium sulfate, calcium sulfate, ferric sulfate, ferric chloride, and mixtures thereof, as described in U.S. Pat. No. 5,779,786, incorporated herein by reference. Another example of set initiators include, but are not limited to, zinc sulfate optionally in combination with iron oxide (e.g., in a weight ratio of 19:1).

Additional examples of set initiators include, but are not limited to, zinc sulfate, aluminum sulfate, sulfuric acid, hydrochloric acid, sodium hydrogen sulfate, potassium hydrogen sulfate, potassium aluminum sulfate, calcium sulfate dihydrate, and mixtures thereof, as described in U.S. Pat. No. 6,805,741, incorporated herein by reference.

Set initiators can optionally also include amine chelating agents.

Set initiators can be added to ready-mixed, setting-type joint compounds at a weight ratio to set retarders of about 1.2:1 to about 6:1, and preferably about 2:1 to about 6:1.

When used, set initiators can be included in or added to drying-type joint compounds and setting-type joint compounds at a weight ratio to set retarders of about 1.2:1 to about 6:1, and preferably about 2:1 to about 6:1.

Other Additives

Other additives that can optionally be included in joint compounds include, but are not limited to, preservatives, fungicides, bactericides, defoaming agents, glycols, humectants, and mixtures thereof. Lecithin can be added but typically there is an absence of lecithin.

Other additives that can optionally be included in joint compounds include, but are not limited to, rheology modifiers which can include surfactants, thickeners, dispersing aids, and/or additional dedusting agents, such as a wax, oil, and/or polyethylene glycol. The plasticizers and the additional dedusting agents may act together to lower airborne dust generation during sanding. When included, the amount of wax, oil and/or polyethylene glycol used in a joint compound of the invention is preferably in a range of about 0.1 wt % to about 1 wt %, more preferably 0.1 wt % to 0.5 wt % on a dry basis of the joint compound.

However, typically there is an absence of additional dedusting agents other than plasticizer. Thus, typically the plasticizer dedusting agent is the sole dedusting agent in compositions of the present invention. In other words, the plasticizers described by the present specification as dedusting agents are typically the only dedusting agents in compositions of the present invention.

For example, there may be an absence of polyethylene glycol (for example polyethylene glycol wax). For example, there is typically an absence of liquid mineral oils and solid waxes; an absence of dust reducing additives such as oils, surfactants, solvents, waxes, and other petroleum derivatives; an absence of oils, such as mineral oils, vegetable oils and animal oils, surfactants, oleoresinous mixtures, pitch, solvents, paraffins, waxes, including natural and synthetic wax, glycols, and other petroleum derivatives; molasses; wax emulsions and polymer coated wax core particulates; antistatic additives (for example as in US 2014/0275369 to Stewart et al).

For drying-type joint compounds the other additives (in total) can be included at up to 10 wt. %, typically about 0.01 wt % to about 10 wt % on a dry basis of the joint compound, and preferably about 0.1 wt % to about 10 wt % on a dry basis.

For setting-type joint compounds and ready-mixed, setting-type joint compounds the other additives (in total) can be included at up to 10 wt. %, typically about 0.01 wt % to about 5 wt % on a dry basis of the joint compound, preferably about 0.01 wt % to about 5 wt % on a dry basis, and most preferably about 0.1 wt % to about 1.0 wt % on a dry basis.

Defoamers reduce or hinder the formation of air bubbles, which may form especially when mixing. Examples of defoamers include, but are not limited to, hydrocarbon-based, silicon-based defoamer, and mixtures thereof.

A glycol can be used in a joint compound to provide functional properties to the joint compound such as wet edge, open time, controlling drying time, and freeze/thaw stability. Examples of glycols include, but are not limited to, diethyl glycol, ethylene glycol, propylene glycol, and mixtures thereof. When included, the amount of glycol used in a joint compound of the invention is preferably in a range of about 0.1 wt % to about 1 wt % or 0.1 wt % to 0.5 wt % or 0.1 wt % to 0.25 wt % on a dry basis of the joint compound.

Clauses Describing Various Characteristics of Products of the Invention

Clause 1. A joint compound comprising:
calcium sulfate hemihydrate and/or at least one filler, wherein a total amount of the at least one filler and/or calcium sulfate hemihydrate is at least about 50 weight percent (wt %), preferably at least 75 wt %, of the joint compound on a dry (water-free) basis, preferably the filler comprises calcium carbonate, calcium sulfate dihydrate, or calcium sulfate anhydrite, or a mixture thereof;
a binder at up to about 15 wt % of the joint compound on a dry basis; a polymer thickener at up to about 3 wt % of the joint compound on a dry basis;
a plasticizer dedusting agent at about 0.01 to about 3 wt %, or typically about 0.05 to about 2 wt %, or typically about 0.1 to about 1 wt %, or more typically about 0.1 to about 0.5 wt % of the joint compound on a dry (water free) basis; and
an additive up to about 10 wt % of the drying-type joint compound on a dry basis.

Clause 2. The joint compound of Clause 1, wherein the plasticizer dedusting agent is about 0.05 to about 2 wt % of the joint compound on a dry (water free) basis.

Clause 3. The joint compound of Clause 1, wherein the joint compound is drying-type joint compound comprising the filler,
wherein the filler comprises a primary filler at about 50 to about 98 wt % of the joint compound on a dry basis and the filler comprises a secondary filler at 0 to about 25 wt % of the joint compound on a dry basis,
wherein the primary filler comprises or consists of any of calcium carbonate, calcium sulfate dihydrate, calcium sulfate anhydrite, or a mixture thereof, and
wherein the plasticizer dedusting agent is about 0.01 to about 3 wt %, typically about 0.05 to about 2 wt %, or typically about 0.1 to about 1 wt %, or typically about 0.1 to about 0.5 wt %, preferably about 0.5 to about 3 wt %, or more preferably about 0.5 to about 2 wt %, or furthermore preferably about 0.7 to about 2 wt %, or most preferably about 0.7 to about 1.5 wt %, of the joint compound on a dry basis.

Clause 4. The joint compound of Clause 1, wherein the joint compound is drying-type joint compound comprising joint compound components and water,
wherein the joint compound components comprise the filler, the binder, the polymer thickener, the plasticizer dedusting agent, and the additive, wherein:
the filler comprises a primary filler at about 50 to about 98 wt % of the drying-type joint compound on a dry basis, wherein the primary filler comprises one selected from the group consisting of calcium carbonate, calcium sulfate dihydrate, and calcium sulfate anhydrite, and a mixture thereof;
the filler comprises a secondary filler at up to about 25 wt % of the drying-type joint compound on a dry basis;
wherein the primary filler and the secondary filler total at least about 75 wt % on a dry basis;
the binder is about 1 to about 15 wt % of the drying-type joint compound on a dry basis;
the polymer thickener is about 0.05 to about 3 wt % of the drying-type joint compound on a dry basis;
the plasticizer dedusting agent is about 0.01 to about 3 wt %, typically about 0.05 to about 2 wt %, or typically about 0.1 to about 1 wt %, or typically about 0.1 to about 0.5 wt %, or typically about 0.3 to about 3 wt %, or preferably about 0.5 to about 3 wt %, more preferably about 0.5 to about 2 wt %, or furthermore preferably about 0.7 to about 2 wt %, or most preferably about 0.7 to about 1.5 wt %, of the joint compound on a dry basis; and
the additive is up to about 10 wt % of the drying-type joint compound on a dry basis; and
wherein the water is at a weight ratio of water to joint compound components of about 1:3 to about 3:1.

Clause 5. The joint compound of Clause 1, wherein the joint compound is setting-type joint compound comprising calcium sulfate hemihydrate, wherein the plasticizer dedusting agent is about 0.05 to about 2 wt % or about 0.1 to about 2 wt % or about 0.5 to about 2 wt % of the joint compound on a dry basis.

Clause 6. The joint compound of Clause 1, wherein the joint compound is setting-type joint compound, wherein:
the calcium sulfate hemihydrate is about 20 to about 99 wt % of the setting-type joint compound on a dry basis;

the filler is from about 0.44 to about 43 wt % of the setting-type joint compound on a dry basis;

the total calcium sulfate hemihydrate and the filler is about 63 wt % to about 99.44 wt % of the setting-type joint compound on a dry basis;

the binder is about 0.5 to about 8 wt % of the setting-type joint compound on a dry basis;

the polymer thickener is about 0.05 to about 2 wt % of the setting-type joint compound on a dry basis;

the plasticizer dedusting agent is at about 0.01 to about 3 wt %, preferably about 0.05 to about 2 wt %, more preferably about 0.1 to about 1 wt %, most preferably about 0.1 to about 0.5 wt %, of the joint compound on a dry (water free) basis; and the additive is up to about 10 wt % of the setting-type joint compound on a dry basis.

Clause 7. The joint compound of Clause 1, wherein the joint compound is ready-mixed type, setting-type joint compound, wherein the plasticizer dedusting agent is about 0.05 to about 2 wt % of the joint compound on a dry (water free) basis.

Clause 8. The joint compound of Clause 1, wherein the joint compound is ready-mixed, setting-type joint compound comprising joint compound components and water, wherein the joint compound components comprise the calcium sulfate hemihydrate, the binder, the polymer thickener, the plasticizer dedusting agent, the additive, a set retarder and, if present, the filler, wherein:

the calcium sulfate hemihydrate is about 20 weight percent (wt %) to about 99 wt % of the ready-mixed, setting-type joint compound on a dry basis;

the filler is about 0.989 wt % to about 55 wt % of the ready-mixed, setting-type joint compound on a dry basis;

the total calcium sulfate hemihydrate and the filler are about 75 wt % to about 99.989 wt % of the ready-mixed, setting joint compound on a dry basis;

the set retarder is about 0.001 to about 2 wt % of the ready-mixed, setting-type joint compound on a dry basis;

the binder is up to about 8 wt % of the ready-mixed, setting-type joint compound on a dry basis;

the polymer thickener is up to about 2 wt % of the ready-mixed, setting-type joint compound on a dry basis;

the plasticizer dedusting agent is about 0.01 to about 3 wt %, preferably about 0.05 to about 2 wt %, more preferably about 0.1 to about 1 wt %, most preferably about 0.1 to about 0.5 wt %, of the joint compound on a dry basis; and the additive is up to about 10 wt % of the ready-mixed, setting-type joint compound on a dry basis; and the water is at a ratio of water to joint compound components of about 1:3 to about 3:1.

Clause 9. The joint compound of Clause 4, wherein the joint compound is the drying-type joint compound and comprises:

the primary filler at about 65 wt % to about 93 wt % of the drying-type joint compound on a dry basis, wherein more than half of the primary filler is calcium carbonate on a wt % dry basis;

the secondary filler at about 3 wt % to about 25 wt % of the drying-type joint compound on a dry basis;

the primary filler and the secondary filler are present as at least about 75 wt % of the joint compound on a dry basis;

the binder at about 1 wt % to about 10 wt % of the drying-type joint compound on a dry basis;

the polymer thickener at about 0.1 wt % to about 2 wt % of the drying-type joint compound on a dry basis;

the plasticizer dedusting agent at about 0.5 wt % to about 1 wt % or preferably about 0.7 wt % to about 1 wt % of the drying-type joint compound on a dry basis;

the additive at about 0.01 wt % to about 10 wt % of the drying-type joint compound on a dry basis; and the water at the ratio of water to joint compound components of about 1:3 to about 1:1.

Clause 10. The joint compound of Clause 4, wherein the joint compound is the drying-type joint compound and comprises:

the primary filler at about 50 wt % to about 93 wt % of the drying-type joint compound on a dry basis, wherein the primary filler is calcium sulfate dihydrate;

the secondary filler at about 3 wt % to about 25 wt % of the drying-type joint compound on a dry basis;

the primary filler and the secondary filler are present as at least about 75 wt % of the joint compound on a dry basis;

the binder at about 1 wt % to about 10 wt % of the drying-type joint compound on a dry basis;

the polymer thickener at about 0.1 wt % to about 2 wt % of the drying-type joint compound on a dry basis;

the plasticizer dedusting agent at about 0.5 wt % to about 1 wt % or preferably about 0.7 wt % to about 1 wt % of the drying-type joint compound on a dry basis; and the additive at about 0.01 wt % to about 10 wt % of the drying-type joint compound on a dry basis; and the water at the ratio of water to joint compound components of about 1:3 to about 1:1.

Clause 11. The joint compound of Clause 6, wherein the joint compound is the setting-type joint compound and comprises:

the calcium sulfate hemihydrate at about 60 wt % to about 85 wt % of the setting-type joint compound on a dry basis;

the filler at about 13.7 wt % to about 29 wt % of the setting-type joint compound on a dry basis;

total calcium sulfate hemihydrate and filler is 89 to 98.7 wt % of the setting-type joint compound on a dry basis, the binder at about 1 wt % to about 4 wt % of the setting-type joint compound on a dry basis;

the polymer thickener at about 0.1 wt % to about 1 wt % of the setting-type joint compound on a dry basis;

the plasticizer dedusting agent at about 0.1 wt % to about 1 wt % of the setting-type joint compound on a dry basis; and the additive at about 0.1 wt % to about 5 wt % of the setting-type joint compound on a dry basis.

Clause 12. The joint compound of Clause 8, wherein the joint compound is the ready-mixed, setting-type joint compound and comprises:

the calcium sulfate hemihydrate at about 60 wt % to about 85 wt % of the ready-mixed, setting-type joint compound on a dry basis;

the filler at about 14.6 wt % to about 28 wt % of the ready-mixed, setting-type joint compound on a dry basis;

total calcium sulfate hemihydrate and filler is 88 to 99.6 wt % of the setting-type joint compound on a dry basis, the set retarder at about 0.1 wt % to about 1 wt % of the ready-mixed, setting-type joint compound on a dry basis the binder at up to about 4 wt % of the ready-mixed, setting-type joint compound on a dry basis;

the polymer thickener at about 0.1 wt % to about 1 wt % of the ready-mixed, setting-type joint compound on a dry basis;

the plasticizer dedusting agent at about 0.1 wt % to about 1 wt % of the ready-mixed, setting-type joint compound on a dry basis;

the additive at about 0.1 wt % to about 5 wt % of the ready-mixed, setting-type joint compound on a dry basis; and the water at the ratio of water to joint compound components of about 1:3 to about 1:1.

Clause 13. The joint compound of any of Clauses 1 to 12, wherein the plasticizer dedusting agent comprises one or more glycol dibenzoates.

Clause 14. The joint compound of any of Clauses 1 to 12, wherein the plasticizer dedusting agent comprises diethylene glycol dibenzoate and/or dipropylene glycol dibenzoate.

Clause 15. The joint compound of any of Clauses 1 to 12, wherein the plasticizer dedusting agent comprises diethylene glycol dibenzoate.

Clause 16. The joint compound of any of Clauses 1 to 12, wherein the plasticizer dedusting agent is present at about 0.01 wt % to about 1 wt %, typically about 0.01 wt % to about 0.5 wt %, of the joint compound on a dry basis.

Clause 17. The joint compound of any of Clauses 1 to 16, wherein the plasticizer dedusting agent is the sole dedusting agent.

Clause 18. The joint compound of any of Clauses 1 to 17, wherein the plasticizer dedusting agent is about 0.3 to about 3 wt %, typically about 0.5 to about 3 wt %, more preferably about 0.5 to about 2 wt %, or about 0.7 to about 2 wt %, or about 0.7 to about 1.5 wt %, of the joint compound on a dry basis Clause 19. The joint compound of any of Clauses 1 to 18, wherein the joint compound exhibiting a mud-like appearance and hardening when exposed to air, the hardened joint compound being smoothable by sanding and generating dust when sanded.

Clause 20. The joint compound of Clause 19, the plasticizer dedusting agent being present in the joint compound in an amount such that the amount of airborne dust generated by sanding the hardened joint compound is less than the amount of airborne dust generated by sanding the same hardened joint compound in the absence of the plasticizer dedusting agent.

Clause 21. A method of using the joint compound of any of Clauses 1 to 20, comprising applying the joint compound to boards, joint tape, and/or another layer of the joint compound.

Clause 22. A method of making the joint compound of any of Clauses 1 to 19, comprising combining the calcium sulfate hemihydrate and/or at least one filler, the binder, the polymer thickener, the plasticizer dedusting agent, and the additive.

Clause 23. The method of Clause 22, wherein the joint compound resulting from combining the calcium sulfate hemihydrate and/or at least one filler, the binder, the polymer thickener, the plasticizer dedusting agent, and wherein the additive exhibits a mud-like appearance and hardens when exposed to air, the hardened joint compound producing airborne dust when sanded, the plasticizer dedusting agent being present in the joint compound in an amount such that the amount of airborne dust generated by sanding the hardened joint compound is less than the amount of dust generated by sanding the same hardened joint compound in the absence of the plasticizer dedusting agent.

Clause 24. The method of Clause 22, wherein the joint compound resulting from combining the plasticizer dedusting agent; the calcium sulfate hemihydrate and/or at least one filler; the binder; the polymer thickener; and the additive hardens when exposed to air, the hardened joint compound producing airborne dust when subjected to sanding to remove an amount of the hardened joint compound, wherein the joint compound generates less airborne dust than a joint compound having the same composition except for an absence of the plasticizer when subjected to sanding to remove the same amount of the hardened joint compound.

EXAMPLES

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

Example 1

Joint compounds were produced according to Table 4. The dedusting agent in Formulations 1, 2 and 3 was a plasticizer (Plasticizer 1), namely a mixture of diethylene glycol dibenzoate, propylene glycol dibenzoate, and dipropylene glycol dibenzoate. The dedusting agent in Formulation 4 was a plasticizer (Plasticizer 2), namely dipropylene glycol dibenzoate. The Control had no plasticizer. Except for the ratio of water to joint compound components, all amounts of components of Table 4 are on a dry (water free) weight percent basis.

TABLE 4

Example formulations

| Component | Control | Formulation 1 | Formulation 2 | Formulation 3 | Formulation 4 |
|---|---|---|---|---|---|
| Calcium carbonate (wt % on a dry basis) | 79.7 | 79.6 | 79.4 | 78.7 | 79.6 |
| Plasticizer 1 (wt % on a dry basis) | 0 | 0.1 | 0.3 | 1.0 | |
| Plasticizer 2 (wt % on a dry basis) | | | | | 0.3 |
| Rheology modifying clays (wt % on a dry basis) | 4.4 | 4.4 | 4.4 | 4.4 | 4.4 |
| Uncoated Perlite (wt % on a dry basis) | 9.6 | 9.6 | 9.6 | 9.6 | 9.6 |
| Latex emulsion binder (wt % on a dry basis) (includes water and solids) | 4.6 | 4.6 | 4.6 | 4.6 | 4.6 |

TABLE 4-continued

Example formulations

| Component | Control | Formulation 1 | Formulation 2 | Formulation 3 | Formulation 4 |
|---|---|---|---|---|---|
| PVA binder (wt % on a dry basis) | 0.3 | 0.3 | 0.3 | 0.3 | 0.3 |
| Cellulosic thickeners (wt % on a dry basis) | 0.9 | 0.9 | 0.9 | 0.9 | 0.9 |
| Other additives* (wt % on a dry basis) | 0.5 | 0.5 | 0.5 | 0.5 | 0.5 |
| Water (weight ratio of water to joint compound components) | 4:5 | 4:5 | 4:5 | 4:5 | 4:5 |

*including biocide

A plasticizer dedusting agent was used at various concentrations by mixing ready mixed joint compound on a Hobart mixer. The plasticizer dedusting agent was added into the base formulation and compared to a control compound. Material was sanded by a robotic sanding device.

The dedusting ability was assessed by measuring airborne dust using a time-weighted average quantity using a dust measurement protocol. The dust measurement protocol included using a robotic sanding device to apply a controlled amount of force to the joint compound specimen through a sanding member as its sanding surface sanded the joint compound specimen over a predetermined sanding path. In particular, the robotic sanding device was a system of US published patent application no. 2017/0241881 to Pelot et al. In each test a uniformly thick 4 inch wide layer of lightweight, ready-mixed joint compound was applied using 0.067 inch thick screed guides on the surface of a 32 inch long gypsum board. After application the applied ready-mixed joint compound then undergoes shrinkage due to drying. The board was about three feet off the ground.

Then this joint compound specimen surface was sanded by a sanding surface of the robotic sanding device. The sanding surface was sanding paper of 150 grit, using the United States CAMI (Coated Abrasive Manufacturers Institute) designation system, that had a size of 3.375 inches wide×9 inches long. The sanding surface of the sanding member was moved relative to the joint compound specimen in a first sanding direction along a sanding axis along a distance (first stroke) before reversing to move in a reverse second direction along the same sanding axis along the same distance (second stroke) and at the same speed. Thus, the sanding surface oscillated to move up and down in a cycle. This movement occurred while applying a controlled amount of force to the joint compound specimen through the sanding member as the sanding surface of the sanding member sands the joint compound specimen. The force acted along a normal axis which is substantially perpendicular to the sanding axis. In particular the robotic sanding device applied pneumatic air pressure of 20 psig to the sanding surface to approximate a typical force a workman would use to apply sandpaper to sand joint compound during sanding. The test was run 40 seconds during which there are about 26 cycles of the oscillating arm to sand until the board paper just became visible. The oscillating robotic sanding arm starts 4 inches from the bottom of the 32 inch board and stops 4 inch from the top of the board; therefore 0.5 cycles is 24 inches. Thus, each cycle has an up stroke of 24 inches and a down stroke of 24 inches. Therefore, total traveling distance of the robotic sanding arm for 26 cycles was 1248 inches (104 feet, 31.7 m).

The level of airborne dust generated by this test was quantified by a DUST TRAK II device placed six feet away from the sample with its inlet nozzle about three feet off the ground placed at a constant height of 3 feet above the ground in a sealed room containing the test sample and the robotic sanding device. The DUST TRAK II device was a light-scattering laser photometer that gave real-time aerosol mass readings and collected a gravimetric sample. However, the aerosol mass measurement device could have been any suitable equipment configured to measure the amount of airborne dust particles. For example, the aerosol mass measurement device could have been in the form of any laser photometer configured to provide real-time aerosol mass readings that can be converted to a time-weighted average quantity using the above dust control measurement protocol. The DUST TRAK II device measured average airborne dust concentration over an interval of 15 minutes from when the sanding commenced. The results for joint compound of the invention were compared against a control compound without (additional) dedusting agent. Airborne dust for purposes of this example and this specification included dust particles of less than ten microns.

In Formulation 3 the Plasticizer 1 dedusting agent was used at 1 wt % of the total composition on a dry (water-free) basis and reduced the level of airborne dust (average airborne dust concentration ($mg/m^3$)) generated by 56% compared to the control. This reduction of the level of airborne dust is termed "Dedusting Efficiency". In Formulations 2 and 4 the plasticizer dedusting agent was reduced to 0.3% dry basis and reduced airborne dust generated by 24% for the 0.3% (dry basis) Plasticizer 1 mixture of diethylene glycol dibenzoate, propylene glycol dibenzoate, and dipropylene glycol dibenzoate; and 17% for the 0.3% (dry basis) Plasticizer 2 dipropylene glycol alone, respectively, compared to the control. In Formulation 1 the Plasticizer 1 dedusting agent was reduced to 0.1% dry basis and reduced airborne dust generated by 10% compared to the control.

Figure 2:
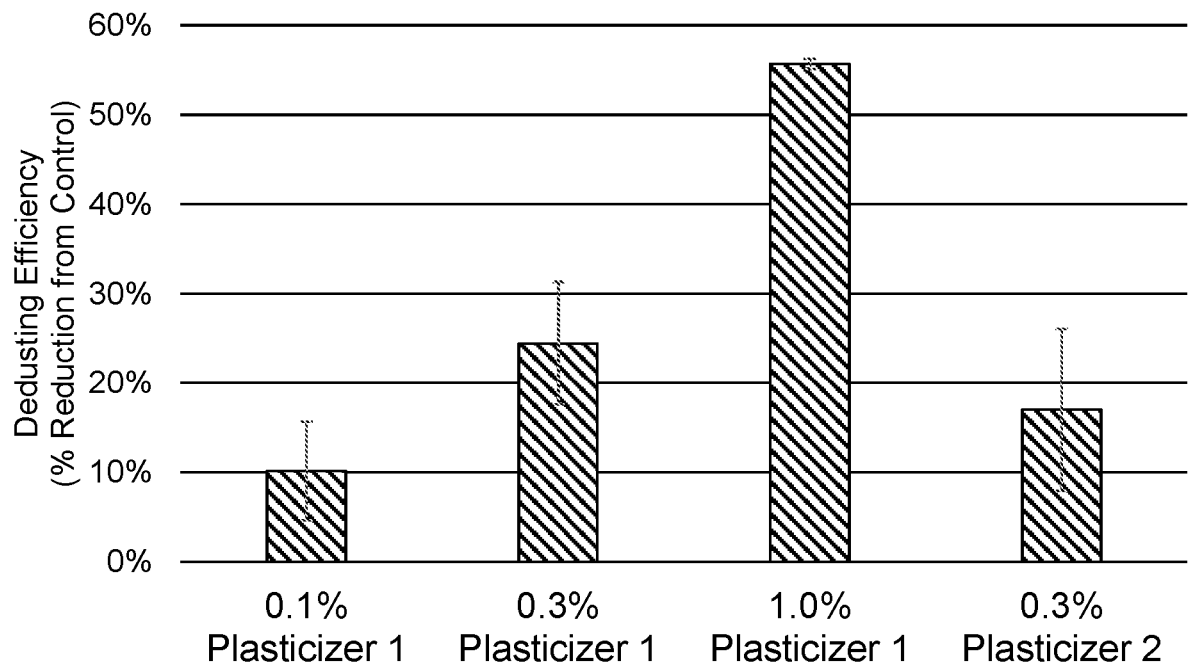
FIG. 2 is a plot of the dedusting efficiency for each Example sample.

FIGS. 1 and 2 show the results for the above-discussed ready-mixed, drying-type joint compound formulations containing either Plasticizer 1 or Plasticizer 2. FIGS. 1 and 2 also indicate standard deviation for the measured values of these results. Each reported result is the average of three runs of the dedusting protocol.

FIG. 1 is a plot of the average airborne dust concentration ($mg/m^3$) produced from each of the above-discussed samples with the Plasticizer 1 mixture of diethylene glycol dibenzoate, propylene glycol dibenzoate, and dipropylene glycol dibenzoate and the sample with the Plasticizer 2 of dipropylene glycol dibenzoate.

FIG. 2 is a plot of the above discussed dedusting efficiency relative to the control for each sample of FIG. 1.

While particular versions of the invention have been shown and described, it will be appreciated by those skilled in the art that changes and modifications may be made thereto without departing from the invention in its broader aspects and as set forth in the following claims.

What is claimed is:

1. A joint compound comprising:
calcium sulfate hemihydrate and/or at least one filler, wherein a total amount of the calcium sulfate hemihydrate and/or the at least one filler is at least 50 weight percent (wt %),
a binder at up to 15 wt % of the joint compound on a dry basis;
a polymer thickener at up to 3 wt % of the joint compound on a dry basis;
a plasticizer dedusting agent at 0.1 to 3 wt % of the joint compound on a dry (water free) basis, wherein the plasticizer dedusting agent is a mixture of diethylene glycol dibenzoate, propylene glycol dibenzoate, and dipropylene glycol dibenzoate; and
an additive up to 10 wt % of the drying-type joint compound on a dry basis;
having an absence of polyvinyl acetate,
having an absence of vinyl acetate,
having an absence of set retarder comprising a polymer composition including acrylic acid and acrylamide monomer units,
having an absence of wax emulsions,
having an absence of polymer coated wax core particulates;
having an absence of wax,
having an absence of paraffins;
having an absence of polyacrylamide;
having an absence of glycol; and
having an absence of copolymer of acrylamide and acrylic acid,
wherein the mixture of diethylene glycol dibenzoate, propylene glycol dibenzoate, and dipropylene glycol dibenzoate is the sole dedusting agent.

2. The joint compound of claim 1, wherein the mixture of diethylene glycol dibenzoate, propylene glycol dibenzoate, and dipropylene glycol dibenzoate is 0.1 to 1.0 wt % of the joint compound on a dry (water free) basis, wherein the binder of the joint compound consists of a member of the group consisting of polyvinyl alcohol, latex emulsions, and mixtures thereof.

3. The joint compound of claim 2, wherein the joint compound is drying-type joint compound comprising the filler,
wherein the filler comprises a primary filler at 50 to 98 wt % of the joint compound on a dry basis and a secondary filler at 0 to 25 wt % of the joint compound on a dry basis,
wherein the primary filler comprises any of calcium carbonate, calcium sulfate dihydrate, calcium sulfate anhydrite, or a mixture thereof, and
wherein the plasticizer dedusting agent is 0.3 to 1 wt %, of the joint compound on a dry basis.

4. The joint compound of claim 1, wherein the joint compound is drying-type joint compound comprising joint compound components and water,
wherein the joint compound components comprise the filler, the binder, the polymer thickener, the plasticizer dedusting agent, and the additive,
wherein:
the filler comprises a primary filler at 50 to 98 wt % of the drying-type joint compound on a dry basis, wherein the primary filler comprises one selected from the group consisting of calcium carbonate, calcium sulfate dihydrate, and calcium sulfate anhydrite, and a mixture thereof;
the filler comprises a secondary filler at up to 25 wt % of the drying-type joint compound on a dry basis;
wherein the primary filler and the secondary filler total at least 75 wt % on a dry basis;
the binder is 1 to 15 wt % of the drying-type joint compound on a dry basis;
the polymer thickener is 0.05 to 3 wt % of the drying-type joint compound on a dry basis;
the plasticizer dedusting agent is 0.5 to 0.1 wt % of the joint compound on a dry basis; and
the additive is up to 10 wt % of the drying-type joint compound on a dry basis; and
wherein the water is at a weight ratio of water to joint compound components of 1:3 to 3:1;
wherein the joint compound has an absence of calcium sulfate hemihydrate and an absence of set retarder,
wherein binder of the joint compound consists of a member of the group consisting of polyvinyl alcohol, vinyl chlorides, vinyl acrylic co-polymer, styrene acrylics, styrene butadiene, polyvinylacrylic, latex emulsions, natural and synthetic starch, casein, and mixtures thereof.

5. The joint compound of claim 1, wherein the joint compound is setting-type joint compound comprising calcium sulfate hemihydrate, wherein the plasticizer dedusting agent is 0.1 to 2 wt % of the joint compound on a dry basis.

6. The joint compound of claim 1, wherein the joint compound is setting-type joint compound, wherein:
the calcium sulfate hemihydrate is 20 to 99 wt % of the setting-type joint compound on a dry basis;
the filler is from 0.44 to 43 wt % of the setting-type joint compound on a dry basis;
the total calcium sulfate hemihydrate and the filler is 63 wt % to about 99.44 wt % of the setting-type joint compound on a dry basis;
the binder is 0.5 to 8 wt % of the setting-type joint compound on a dry basis;
the polymer thickener is 0.05 to 2 wt % of the setting-type joint compound on a dry basis;
the plasticizer dedusting agent is 0.1 to 3 wt % of the joint compound on a dry (water free) basis; and
the additive is up to 10 wt % of the setting-type joint compound on a dry basis,
wherein binder of the joint compound consists of a member of the group consisting of polyvinyl alcohol, vinyl chlorides, vinyl acrylic co-polymer, styrene acrylics, styrene butadiene, polyvinylacrylic, latex emulsions, natural and synthetic starch, casein, and mixtures thereof.

7. The joint compound of claim 1, wherein the joint compound is ready-mixed type, setting-type joint compound comprising a set retarder, wherein the set retarder is 0.001 to 2 wt % of the ready-mixed, setting-type joint compound on a dry basis, wherein the plasticizer dedusting agent is 0.1 to 2 wt % of the joint compound on a dry (water free) basis.

8. The joint compound of claim 1, wherein the joint compound is ready-mixed, setting-type joint compound comprising joint compound components and water, wherein the joint compound components comprise the calcium sulfate hemihydrate, the binder, the polymer thickener, the plasticizer dedusting agent, the additive, a set retarder and, if present, the filler,
wherein:
the calcium sulfate hemihydrate is 20 weight percent (wt %) to 99 wt % of the ready-mixed, setting-type joint compound on a dry basis;

the filler is 0.989 wt % to 55 wt % of the ready-mixed, setting-type joint compound on a dry basis;

the total calcium sulfate hemihydrate and the filler are 75 wt % to 99.989 wt % of the ready-mixed, setting joint compound on a dry basis;

the set retarder is 0.001 to 2 wt % of the ready-mixed, setting-type joint compound on a dry basis;

the binder is up to 8 wt % of the ready-mixed, setting-type joint compound on a dry basis;

the polymer thickener is up to 2 wt % of the ready-mixed, setting-type joint compound on a dry basis;

the plasticizer dedusting agent is 0.1 to 3 wt % of the joint compound on a dry basis; and the additive is up to 10 wt % of the ready-mixed, setting-type joint compound on a dry basis; and the water is at a ratio of water to joint compound components of 1:3 to 3:1, wherein binder of the joint compound consists of a member of the group consisting of polyvinyl alcohol, vinyl chlorides, vinyl acrylic co-polymer, styrene acrylics, styrene butadiene, polyvinylacrylic, latex emulsions, natural and synthetic starch, casein, and mixtures thereof.

9. The joint compound of claim 4, wherein the joint compound is the drying-type joint compound and comprises:

the primary filler at 65 wt % to 93 wt % of the drying-type joint compound on a dry basis, wherein more than half of the primary filler is calcium carbonate on a wt % dry basis;

the secondary filler at 3 wt % to 25 wt % of the drying-type joint compound on a dry basis;

the primary filler and the secondary filler are present as at least 75 wt % of the joint compound on a dry basis;

the binder at 1 wt % to 10 wt % of the drying-type joint compound on a dry basis;

the polymer thickener at 0.1 wt % to 2 wt % of the drying-type joint compound on a dry basis;

the plasticizer dedusting agent at 0.3 wt % to 1 wt % of the drying-type joint compound on a dry basis;

the additive at 0.01 wt % to 10 wt % of the drying-type joint compound on a dry basis; and the water at the ratio of water to joint compound components of 1:3 to 1:1.

10. The joint compound of claim 6, wherein the joint compound is the setting-type joint compound and comprises:

the calcium sulfate hemihydrate at 60 wt % to 85 wt % of the setting-type joint compound on a dry basis;

the filler at 13.7 wt % to 29 wt % of the setting-type joint compound on a dry basis;

total calcium sulfate hemihydrate and filler is 89 to 98.7 wt % of the setting-type joint compound on a dry basis, the binder at 1 wt % to 4 wt % of the setting-type joint compound on a dry basis;

the polymer thickener at 0.1 wt % to 1 wt % of the setting-type joint compound on a dry basis;

the plasticizer dedusting agent at 0.1 wt % to 1 wt % of the setting-type joint compound on a dry basis; and the additive at 0.1 wt % to 5 wt % of the setting-type joint compound on a dry basis.

11. A ready-mixed, setting-type joint compound comprising joint compound components and water, wherein the joint compound components comprise calcium sulfate hemihydrate, binder, polymer thickener, plasticizer dedusting agent, additive, set retarder and filler, having an absence of polyvinyl acetate, having an absence of vinyl acetate, having an absence of set retarder comprising a polymer composition including acrylic acid and acrylamide monomer units, having an absence of wax emulsions, having an absence of polymer coated wax core particulates;

having an absence of wax, having an absence of paraffins;

having an absence of polyacrylamide;

having an absence of glycol; and having an absence of copolymer of acrylamide and acrylic acid, wherein the ready-mixed, setting-type joint compound comprises:

the calcium sulfate hemihydrate at 60 wt % to 85 wt % of the ready-mixed, setting-type joint compound on a dry (water free) basis;

the filler at 14.6 wt % to 28 wt % of the ready-mixed, setting-type joint compound on a dry basis;

total calcium sulfate hemihydrate and filler is 88 to 99.6 wt % of the setting-type joint compound on a dry basis;

the set retarder at 0.1 wt % to 1 wt % of the ready-mixed, setting-type joint compound on a dry basis;

the binder at up to 4 wt % of the ready-mixed, setting-type joint compound on a dry basis;

the polymer thickener at 0.1 wt % to 1 wt % of the ready-mixed, setting-type joint compound on a dry basis;

the plasticizer dedusting agent at 0.1 wt % to 1 wt % of the ready-mixed, setting-type joint compound on a dry basis, wherein the plasticizer dedusting agent is a mixture of diethylene glycol dibenzoate, propylene glycol dibenzoate, and dipropylene glycol dibenzoate;

the additive at 0.1 wt % to 5 wt % of the ready-mixed, setting-type joint compound on a dry basis; and the water at the ratio of water to joint compound components of 1:3 to 1:1, wherein the mixture of diethylene glycol dibenzoate, propylene glycol dibenzoate, and dipropylene glycol dibenzoate is the sole dedusting agent.

12. The joint compound of claim 1, wherein the joint compound is drying-type joint compound that comprises 0.1 wt. % to 0.3 wt. % said mixture of diethylene glycol dibenzoate, propylene glycol dibenzoate, and dipropylene glycol dibenzoate on a dry basis;

wherein the joint compound has an absence of calcium sulfate hemihydrate and an absence of set retarder.

13. The joint compound of claim 12, wherein the joint compound is drying-type joint compound comprising the filler, wherein the filler comprises a primary filler at 50 to 98 wt % of the joint compound on a dry basis and a secondary filler at 0 to 25 wt % of the joint compound on a dry basis, and wherein the primary filler comprises any of calcium carbonate, calcium sulfate dihydrate, calcium sulfate anhydrite, or a mixture thereof.

14. The joint compound of claim 1, wherein the mixture of diethylene glycol dibenzoate, propylene glycol dibenzoate, and dipropylene glycol dibenzoate is present at 0.3 wt % to 1 wt % of the joint compound on a dry basis.

15. A joint compound, consisting of, on a dry basis, calcium sulfate hemihydrate and/or at least one filler, wherein a total amount of the calcium sulfate hemihydrate and/or the at least one filler is at least 50 weight percent (wt %), a binder at up to 15 wt % of the joint compound on the dry basis;
a polymer thickener at up to 3 wt % of the joint compound on the dry basis;
a plasticizer dedusting agent at 0.1 to 3 wt % of the joint compound on the dry (water free) basis, wherein the plasticizer dedusting agent is selected from at least one member of the group consisting of one or more of diethylene glycol dibenzoate, propylene glycol dibenzoate, and dipropylene glycol dibenzoate;
an additive up to 5 wt % of the drying-type joint compound on the dry basis, wherein the additive is selected from the group consisting of preservatives, fungicides, bactericides, defoaming agents, glycols, humectants, and mixtures thereof;
optionally at least one set retarder selected from the group consisting of zinc hexametaphosphate, potassium tripolyphosphate, tetra sodium pyrophosphate, sodium tripolyphosphate, monoammonium phosphate, and monobasic potassium phosphate, polyacrylic acid and/or a salt of polyacrylic acid, wherein there is an absence of set retarder that is a polymer composition including acrylic acid and acrylamide monomer units; and
optionally at least one set accelerator selected from the group consisting of aluminum sulfate, potassium sulfate, calcium sulfate, ferric sulfate, ferric chloride, and mixtures thereof; and
having an absence of polyvinyl acetate,
having an absence of vinyl acetate,
having an absence of wax emulsions,
having an absence of polymer coated wax core particulates;
having an absence of wax, having an absence of paraffins;
having an absence of polyacrylamide;
having an absence of glycol; and
having an absence of copolymer of acrylamide and acrylic acid,
wherein a mixture of diethylene glycol dibenzoate, propylene glycol dibenzoate, and dipropylene glycol dibenzoate is the sole dedusting agent.

16. The joint compound of claim 15, wherein
the joint compound has an absence of calcium sulfate hemihydrate and an absence of set retarder.

17. The joint compound of claim 15, wherein the joint compound is drying-type joint compound and wherein:
the primary filler is 65 wt % to 93 wt % of the drying-type joint compound on a dry basis, wherein more than half of the primary filler is calcium carbonate on a wt % dry basis;
the secondary filler is 3 wt % to 25 wt % of the drying-type joint compound on a dry basis;
the primary filler and the secondary filler are present as at least 75 wt % of the joint compound on a dry basis;
the binder is 1 wt % to 10 wt % of the drying-type joint compound on a dry basis;
the polymer thickener is 0.1 wt % to 2 wt % of the drying-type joint compound on a dry basis;
the plasticizer dedusting agent is 0.3 wt % to 1 wt % of the drying-type joint compound on a dry basis;
the additive is up to 5 wt % of the drying-type joint compound on a dry basis,
wherein the joint compound has an absence of polyvinyl acetate,
wherein the joint compound has an absence of vinyl acetate,
wherein the joint compound has an absence of calcium sulfate hemihydrate and an absence of set retarder;
wherein the binder is a member of the group consisting of polyvinyl alcohol, vinyl chlorides, vinyl acrylic co-polymer, styrene acrylics, styrene butadiene, polyvinylacrylic, latex emulsions, natural and synthetic starch, casein, and mixtures thereof.

18. The joint compound of claim 15, wherein the joint compound is setting-type joint compound and the calcium sulfate hemihydrate is present, wherein the plasticizer dedusting agent is 0.1 to 0.5 wt % of the joint compound on a dry basis.

* * * * *